United States Patent [19]
Antunez

[11] Patent Number: 5,150,732
[45] Date of Patent: Sep. 29, 1992

[54] BOOSTED DIFFERENTIAL PRESSURE-TYPE TANK VALVE

[76] Inventor: Bruce A. Antunez, 1143 Indian Springs, Glendora, Calif. 91740

[21] Appl. No.: 745,600

[22] Filed: Aug. 14, 1991

[51] Int. Cl.⁵ .................. F16K 31/18; F16K 33/00
[52] U.S. Cl. ................................ 137/414; 137/432; 137/449; 251/46
[58] Field of Search .......... 137/410, 414, 429, 430, 137/432, 437, 445, 449; 251/35, 45, 46

[56] References Cited

U.S. PATENT DOCUMENTS

| | | | |
|---|---|---|---|
| 2,809,656 | 10/1957 | Goldtrap | 137/432 |
| 3,144,874 | 8/1964 | Goldtrap | 137/414 |
| 3,144,875 | 8/1964 | Goldtrap | 137/414 |
| 3,544,219 | 1/1971 | Hudson | 137/414 |
| 3,729,017 | 4/1973 | Brandelli | 137/414 |
| 4,186,765 | 2/1980 | Anderson | 137/414 |
| 4,341,238 | 7/1982 | Roosa et al. | 137/414 |
| 4,431,024 | 2/1984 | Gallagher | 137/413 |
| 4,573,495 | 3/1986 | Rothe et al. | 137/414 |
| 4,842,011 | 6/1989 | Roosa | 137/414 |

Primary Examiner—George L. Walton
Attorney, Agent, or Firm—Donald D. Mon

[57] ABSTRACT

A tank valve for maintaining a water lever storage level in a tank. The tank valve includes differential pressure valve workings under control of a pivot member. A float enables the valve to open when resting on the pivot member and opens the valve when it rises free of the pivot member. A boost link depends from the pivot member to be boosted by the float near the end of its upward travel to assure closure of the valve working when an intended water level has be attained.

2 Claims, 3 Drawing Sheets

BOOSTED DIFFERENTIAL PRESSURE-TYPE TANK VALVE

FIELD OF THE INVENTION

This invention relates to tank valves which maintain a storage water level in water tanks such as tanks for commodes.

BACKGROUND OF THE INVENTION

Tank valves of the class contemplated by this invention are intended to supply water to a storage tank so as to tend to maintain the water level at some predetermined storage level. Especially in tank valves for commodes, they are accompanied by a flush valve.

The flush valve is closed at the end of each discharge (flushing) cycle. At the end of the flushing cycle, the water in the tank must be replenished to be available for the next cycle. The tank valve is provided for this purpose. It is sensitive to the water level that exists in the tank. When the water level is below the intended storage level, the tank valve opens to flow, and will remain open to flow until the water again rises to the intended storage level.

These statements describe very conventional means to store and discharge water for flushes. The art is extensively developed. The tank valve is invariably provided with a float of some kind which, when its elevation coincides with the intended storage level, closes off the tank valve.

Tank valves which include a float on a pivoted arm to control the tank valve by pressing as a lever on a valve mechanism are exemplified by Antunez U.S. Pat. No. 3,070,118. This is perhaps the most widely used type of tank valve at the present time.

There is another type of tank valve which relies on a differential pressure instead of a direct force linkage to open and to close a tank valve. In this type of tank valve, its opening and closing are determined by a diaphragm or piston whose position is the consequence of a differential pressure and area. The pressures involved are atmosphere and the water supply line pressure. The selective differential is developed by closing or opening a vent port in response to the level of a float.

The opening of such a valve involves no special problems despite the fact that the float and the valve workings are not directly linked, because the weight of the unsupported float against the valve working will be sufficient to assure an opening action.

The closure of the valve involves a very different situation. Here the float gradually rises with the water level, and ultimately freely and independently moves away from the valve workings. The theory is that the parts of the workings which actually control the valve setting will follow the float upwardly as far as necessary as a consequence of internal fluid forces in the valve even though the physical parts are not directly linked together. This gives rise to an occasional problem when the parts become stuck. This can arise from occasional dimensional interferences, from silting up, and from liming up, as examples. Because the float does not then tend to free the linkage, the valve can remain open when it should instead be shut.

It is an object of this invention to provide a float-controlled differential-pressure type tank valve whose valve workings and its float are not directly linked to one another, and in which means is provided for the valve to boost the valve workings when the tank valve is to be closed so as to assure closing of the valve.

BRIEF DESCRIPTION OF THE INVENTION

This invention is utilized in a differential-pressure type tank valve having an upright central axis, a control chamber divided by a diaphragm, exposed to supply line pressure on one side and through a vent port to atmosphere on the other side. A bleed orifice of limited size passes through the diaphragm. The vent port is adapted to be opened by a pivot member when it is pressed down by a float, and to be closed when the float member rises and lifts free of the pivot member.

The float overhangs the valve workings and the pivot member. It is adapted to contact the pivot member when the water level is below the intended storage level, and to move up and away from the linkage when the water level is at or above the intended storage level.

According to this invention, the pivot member is provided with a boost rod which is contacted by the float when the float rises and reaches the intended water storage level. The resulting boost force on the pivot member assures that the valve will not stick open, and that the valve will certainly close.

The above and other features of this invention will be fully understood from the following detailed description and the accompanying drawings, in which:

DETAILED DESCRIPTION OF THE DRAWINGS

Figures 1, 4:
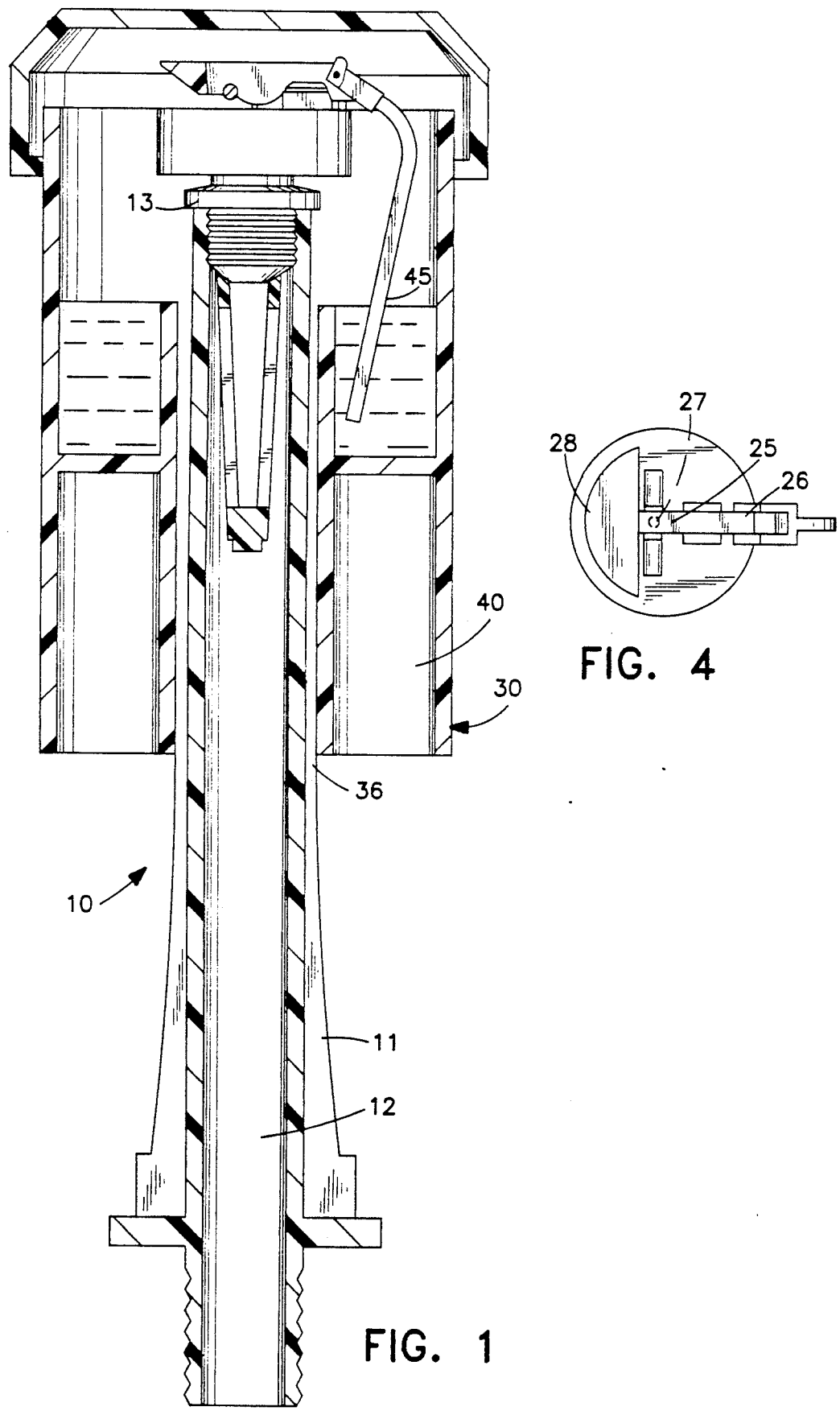
FIG. 1 is an axial cross-section of a tank valve according to the invention in its open condition.
FIG. 4 is a top view of a portion of FIG. 1.
Figure 2:
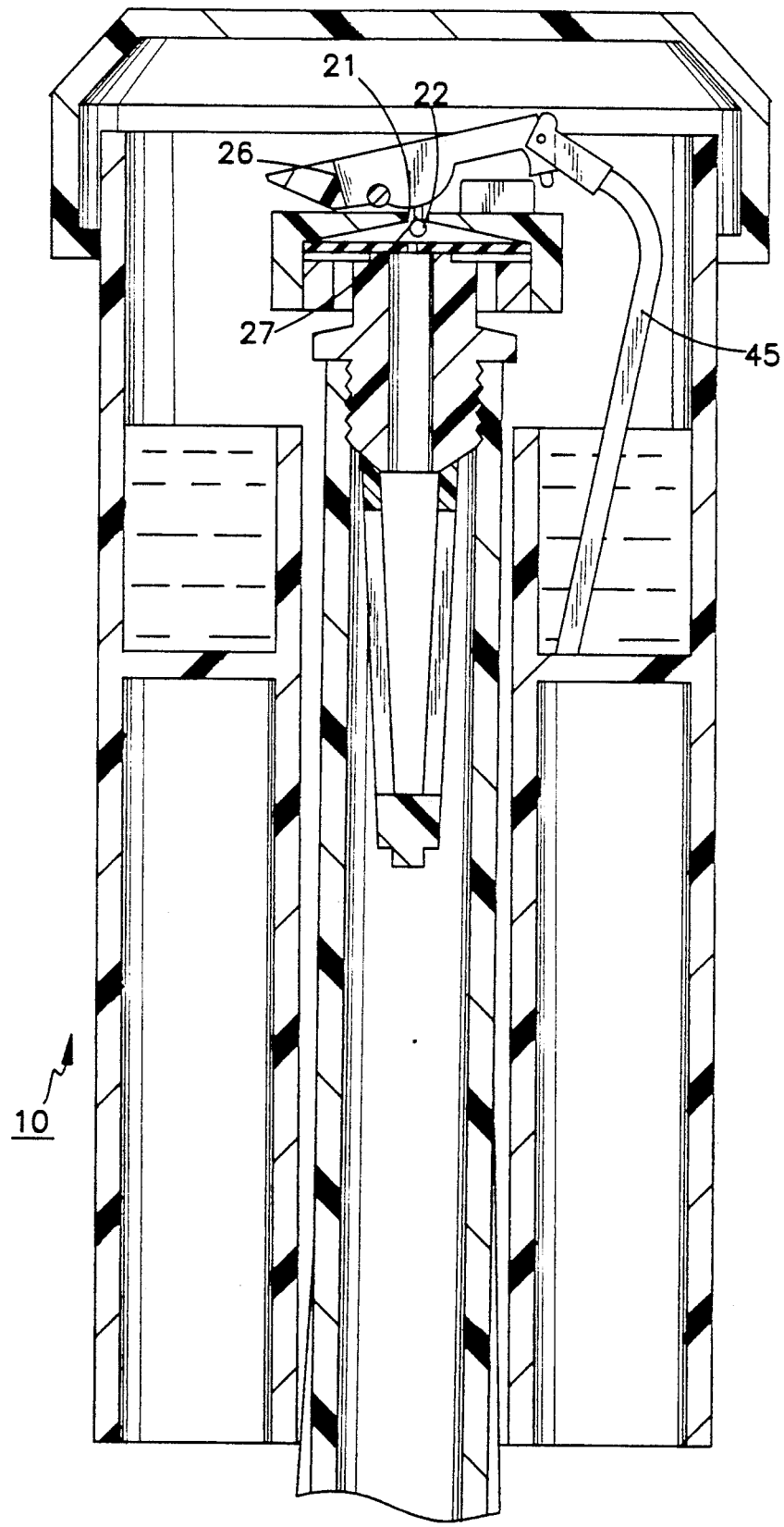
FIG. 2 is an axial cross-section of the same valve in its closed condition.
Figure 3:
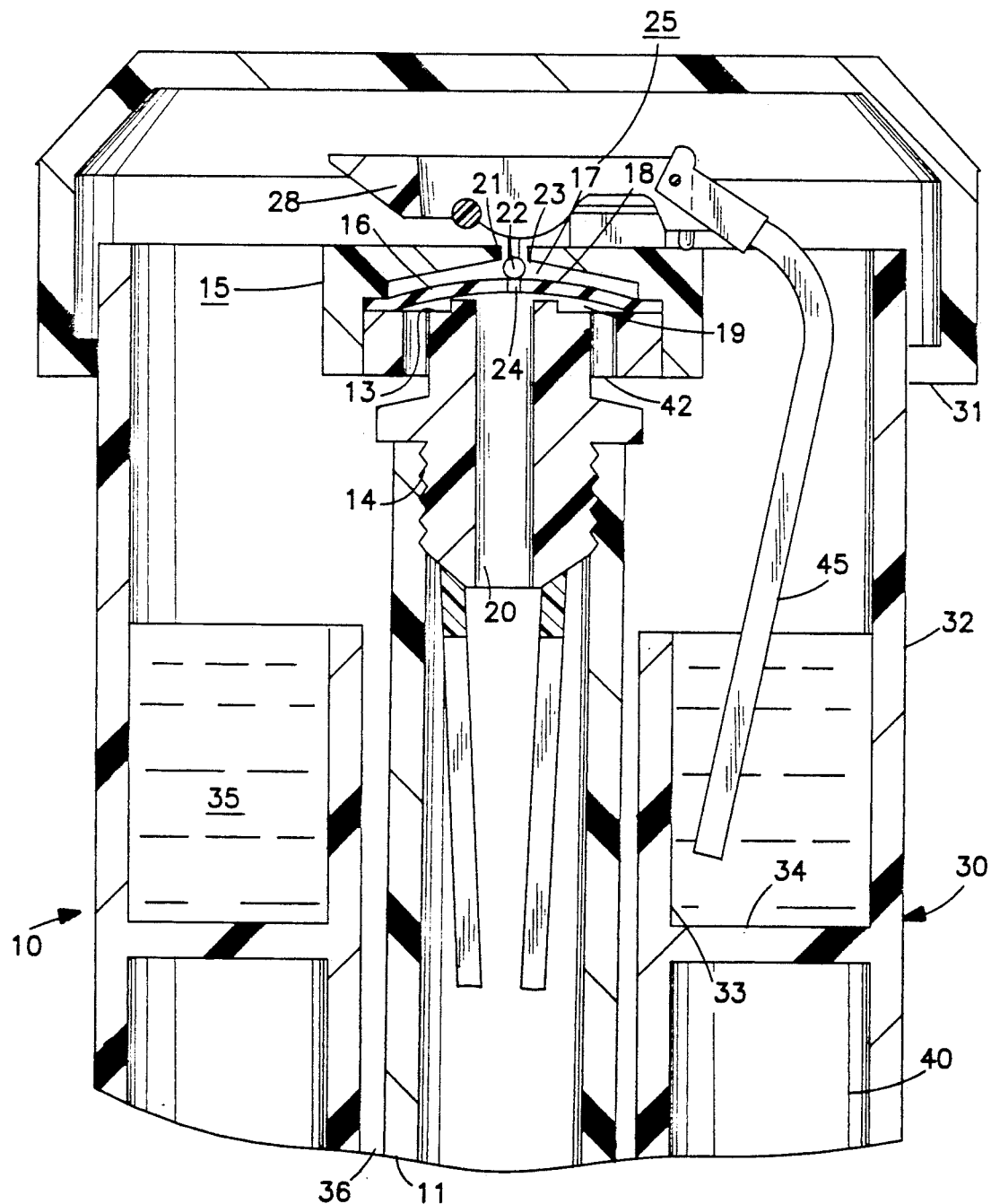
FIG. 3 is an enlarged fragment of the valve in its open condition.

FIGS. 1 and 2 show a tank valve 10 according to the invention. A riser 11 is mounted to a tank (not shown) and is connected to a supply line (also not shown) which provides water under system pressure. The riser extends along the central axis 12 of the valve to an upper end 13 that has an internal thread 14.

Valve workings 15 are threaded into thread 14. Briefly stated, a flexible diaphragm 16 divides a control chamber 17 into an upper portion 18 and a lower portion 19.

The lower portion is always connected to supply line pressure through passage 20. The upper portion is selectively connectible to atmosphere through a vent port 21. A valve ball 22 is adapted to be moved upwardly by fluid pressure. In its upper position shown in FIG. 2 it closes the vent port by seating against seat 23 in the vent port.

A bleed orifice 24 passes through the diaphragm. It is always open, and has a small bore that limits the rate of flow of water through it. The ball does not seat on it or close it.

A pivot member 25 is hinge mounted to the workings. It includes a lever 26 with a finger 27 adapted to be brought to bear against the ball to unseat the ball. It has a counter weight 28 that biases the lever counter-closure as viewed in the FIGS. When not contacted by the float the lever pivot swings upwardly away from the vent port to allow the ball to rise and close the vent port. This is the means by which the valve is opened and closed.

A float 30 is cup-like. It has a cap 31 and a circular skirt 32. The skirt has an internal cylindrical wall 33 and a disc-like partition 34 forming a counter weight chamber 35 which fills with water discharged from the valve workings. The excess water flows through spacing 36 to fill the tank. The weight of the retained water in chamber 35 (which does not drain) assures that the float will have sufficient weight to force the pivot member against the ball to unseat the ball from seat 23 to open the valve workings.

A buoyancy chamber 40 is formed beneath partition 34. It is always filled with air, and gives sufficient lift to raise the float along with the water level.

In operation, when the water level is at the intended storage level (FIG. 2) the pivot member will have risen far enough that the ball is released to seat and close the vent port. Then the pressure in the upper portion 18 rises to system pressure because system pressure bleeds into it through bleed orifice 24. The exposed diaphragm area in upper portion 18 is larger than that in lower portion 19. This results in a net downward force which seats the diaphragm on a valve seat 41 which surrounds the supply passage. Importantly, it also prevents flow to discharge ports 42. Thus, the valve is closed.

The valve opens when the flush valve has been opened and the float follows the lowering water level. Finally the cap bears against the pivot member and the float hangs up on the workings. Importantly, it has pressed the ball down, thereby opening vent port 21. This drains water and pressure in from the upper portion faster than it can be built up through the bleed orifice. Then the diaphragm moves up and the valve is open. It stays open because there is no net downward force on the diaphragm until the ball is again seated.

As can be seen in FIG. 1, there can be the risk that when the float rises free of the pivot member, the pivot member might stick and the valve would remain open. Means is provided to avoid this circumstance. According to this invention, a boost link 45 is pivotally joined to the pivot member. It has a length such that when the valve is open to flow, it freely dangles (FIG. 1). However, when the float rises to a sufficiently high level, at or near the storage level, partition 34 will bear against the boost link and push it up (FIG. 2), in turn moving the pivot member countercockwise to release the ball. This is an additional force tending to lift the finger away from the ball. It assures that the valve will close.

Thus, this invention makes more reliable a very attractive alternative type of tank valve.

This invention is not to be limited by the embodiment shown in the drawings and described in the description which is given by way of example and not of limitation, but only in accordance with the scope of the appended claims.

I claim:

1. In a differential pressure type valve of the type having a vertically oriented water supply riser, a main valve mounted to said riser to control the flow of water from said riser, a pilot valve on said main valve to control the opening and closing of said main valve, a pivot member pivotally mounted to said main valve to control the opening and closing of said pilot valve, a float freely fitted over said valves and riser adapted to rise and fall with the level of water in a tank in which the riser is fitted, said float having an upwardly-facing abutment means, said float being so disposed and arranged as to rest on said pivot member when the water level in the tank is below an intended storage level, and to rise free of the pivot member when the water level is at or above the intended storage level, the improvement comprising:

a boost link on said pivot member projecting downwardly toward said abutment means and so disposed and arranged as to be boosted by said abutment means when the water level is at or above the desired storage level to assure that the pilot valve is set in a condition to close the main valve.

2. A valve according to claim 1 in which said float is an inverted cup, and in which the abutment means is an internal peripheral flange in said cup.

* * * * *